United States Patent [19]
Wales

[11] Patent Number: 5,091,918
[45] Date of Patent: Feb. 25, 1992

[54] EQUALIZERS

[75] Inventor: Stephen W. Wales, Southampton, England

[73] Assignee: Plessey Overseas Limited, Ilford, England

[21] Appl. No.: 583,984

[22] Filed: Sep. 18, 1990

Related U.S. Application Data

[63] Continuation of Ser. No. 318,314, Mar. 3, 1989, abandoned.

[30] Foreign Application Priority Data

Mar. 5, 1988 [GB] United Kingdom ............... 8805305

[51] Int. Cl.$^5$ .................... H03H 2/40; H09B 15/02
[52] U.S. Cl. ............................... 375/11; 375/99
[58] Field of Search .............. 375/11, 39, 58, 94, 375/99, 90, 47, 96, 12, 14; 371/43; 364/724.2; 329/349

[56] References Cited

U.S. PATENT DOCUMENTS 4,837,766 6/1989 Yoshida ........................... 375/43

Primary Examiner—Benedict V. Safourek
Assistant Examiner—Tesfaldet Bocure
Attorney, Agent, or Firm—Fleit, Jacobson, Cohn, Price, Holman & Stern

[57] ABSTRACT

A GMSK radio receiver for operation in the presence of strong multipath interference, comprising a baseband frequency converter which operates so as to produce I and Q baseband GMSK signals, which will be distorted by any multipath interference present, which are correlated with a plurality of different possible signals to afford in respect of each correlation a probability signal, the probability signals being processed to determine the significance of the signal received, whereby the transmitted data is determined in the presence of multipath interference.

5 Claims, 4 Drawing Sheets

EQUALIZERS

This application has been extensively revised and is believed to be a continuation of U.S. application Ser. No. 07/318,314, filed Mar. 3, 1989, now abandoned.

FIELD OF THE INVENTION

This invention relates to equalisers for radio receivers of the kind destined for operation in the presence of strong multipath interference, for example, in built-up inner city areas.

BACKGROUND OF THE INVENTION

Mobile telephones, for example, include a transceiver of which the receiver receives transmissions from a base station. The transmissions are usually in the form of frequency modulated signals utilising a high frequency carrier wave. Information to be transmitted may be voice or data information. In the former case, the audio signal is converted to digital form. Data information is normally in digital form. The digital information is chopped into packets of predetermined length and to each packet is added a header. The packets are usually transmitted in a time division multiplexed manner. Guassian Minimum Shift Keying (GMSK) is often used for transmissions of this kind. The bit stream of a packet, which may have been encoded in some manner, is passed through a Guassian filter. The effect of the filter is to modulate each information bit in dependence upon the preceding bits. The waveform so formed is used to modulate the high frequency carrier wave and is transmitted in its appropriate time slot.

In the receiver, the received r.f. signal is converted to baseband. If no interference is present, the baseband signal would only require decoding and demodulating to reconstitute the bitstream representing the transmitted information.

Particularly in built up areas, multipath reflections of the transmitted signal gives rise to multipath interference in which a last received echo may have been delayed by, for example, a time equal to four bit intervals. This multipath interference is known as "channel impulse response" and hence the received baseband signal is distorted by the channel impulse response.

It is known to include, in each transmitted packet header, a predetermined encoded and Guassian filtered bitstream. If the portion of each received distorted packet which includes this predetermined bitstream is compared in the receiver with an interference free representation of the same bitstream, the channel impulse response can be determined. The now-known channel impulse response enables the rest of the information in the packet to be interpreted on a probability basis. This may be effected using a Viterbi algorithm to compare the received distorted GMSK signal with all possible signals and to select, on the basis of probability, a "most likely" signal. Such selected most likely signal is then assumed to be the original undistorted signal.

Assuming only seven bit words in the transmitted data, an apparatus to effect a complete comparison, employing the Viterbi algorithm, would be complex, expensive, and of size and power requirements such that it would not constitute a commercial solution to the problem of multipath interference, particularly in receivers such as those used in mobile telephones.

It is an object of the present invention to provide an equaliser, for a radio receiver, wherein the aforesaid disadvantages are overcome.

SUMMARY OF THE INVENTION

According to the present invention, there is provided an equalizer for a radio receiver, said equalizer comprising:

a converter for producing, from a received signal, digital samples at baseband, the received radio signal being in packet form and including a header having a predetermined bit sequence;

means for providing an estimate of channel distortion by comparing the received predetermined bit sequence with a stored version of the predetermined bit sequence in the receiver;

a store in which are stored signal sets;

means for applying the estimate of channel distortion to the stored signal sets;

means for selecting modulated ones of the stored signal sets;

metric generating means receiving said selected modulated stored signal sets and digital samples of said received radio signal for generating metrics of the selected stored modulated signal sets and the digital samples;

and a processor for processing the generated metrics in accordance with a Viterbi algorithm to determine the most probable value of each digital sample of the received radio signal.

DETAILED DESCRIPTION OF THE DRAWINGS

In the example hereinafter described, it is assumed that voice or data signals are transmitted in packets by a known system using Guassian Minimum Shift Keying (GMSK) In such a system, the information to be transmitted is in, or is converted to digital form and is passed through a Guassian filter. The individual bits are each modified in dependence upon one or more preceding bits. The so modified signals are then encoded (or may have been encoded before passage through the Guassian filter) and are used to modulate, e.g. frequency modulate, a high frequency carrier wave. The modulated carrier wave having, as its modulation, the digitized, filtered encoded information, is then transmitted, each packet in a respective time slot of a time division multiplexed transmission system by, for example, a mobile telephone base transmitter.

As described in relation to the prior art, each packet includes a header comprising, at least, an address and a predetermined bit sequence. A receiver, according to the present invention, has stored therein an encoded and Guassian filtered version of this predetermined bit sequence. The stored version thus constitutes an interference free version of that part of the transmitted signal corresponding to the predetermined bit sequence.

If the stored version and the received version are compared, an estimate of the channel impulse response can be obtained. The channel impulse response is, as above stated, the distortion due to multipath interference caused by signal reflection from buildings. This multipath interference mainly comprises signal echoes (delayed signals), due to different path lengths for reflected signals, superimposed on the received signal. The different path lengths may cause delays up to 4T, where T is the bit interval, i.e. delays of up to four bits of data.

The invention is directed to extracting the wanted signal from the distorted signal caused by multipath interference.

Figure 1:
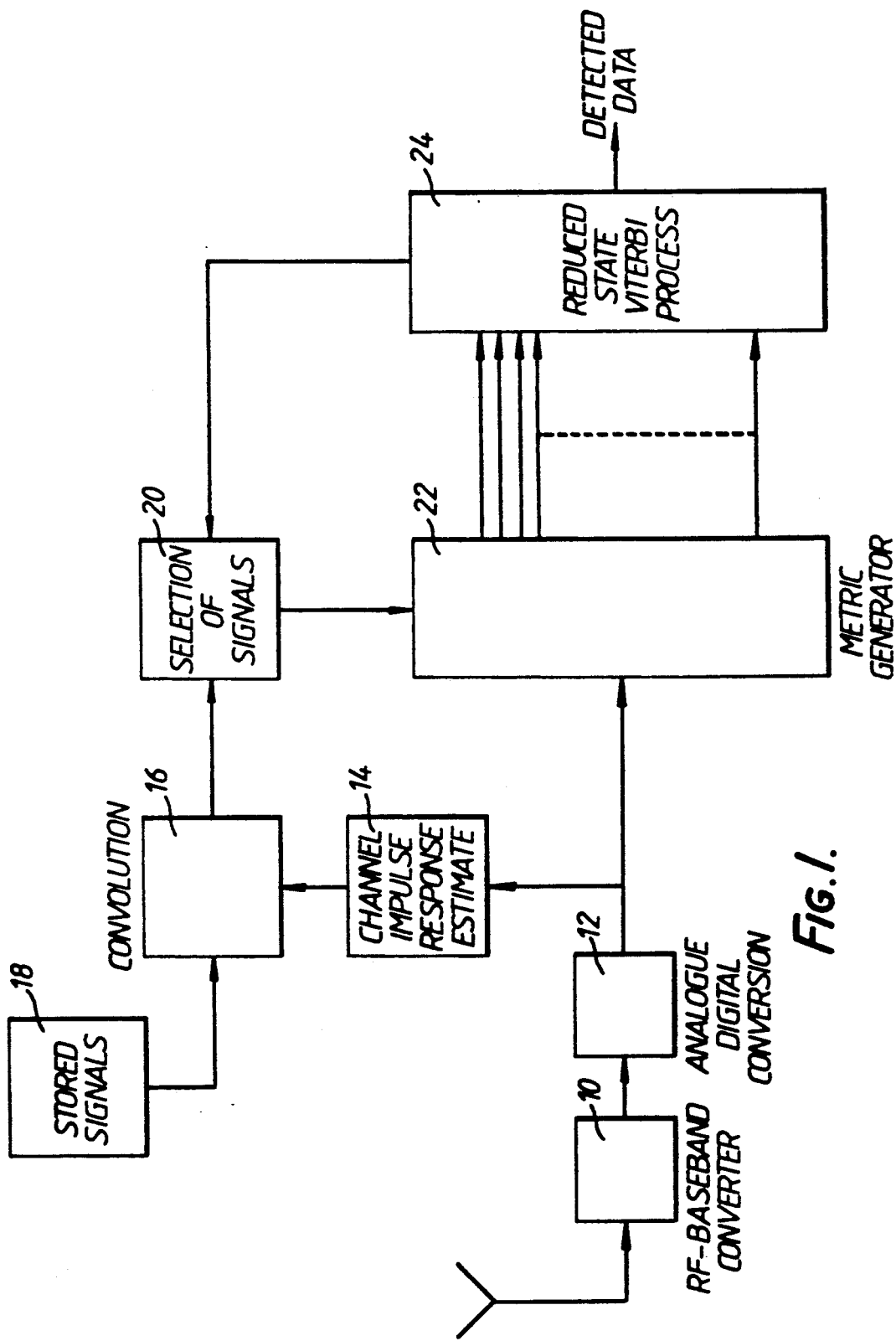
FIG. 1 is a block schematic diagram of part of a receiver including an equaliser according to the present invention.

Referring now to FIG. 1, a distorted received signal is passed from the aerial of a receiver to a baseband frequency converter 10 wherein the carrier wave is stripped from the input signal. The converter 10 outputs I and Q baseband, distorted GMSK signals.

In each packet, the first part of the distorted received signal corresponds to the predetermined bit sequence. The distorted baseband GMSK signals are sampled at bit frequency and the samples are converted from analog to digital values in A to D converters 12. A channel impulse response estimator 14 is provided. The digital value of each sample of the predetermined bit sequence is fed from the converter 12 thereto and compared with the digital value of the interference free signal stored therein. The comparison enables an estimate of the channel impulse response to be determined. The estimated channel impulse response h(t) is fed to a convoluter 16.

A store 18 stores signal sequences therein. For a full Viterbi processor, assuming seven bit words, $2^7$ i.e. 128 signal sequences would be stored therein. These signal sequences would each represent a respective one of every possible combination of seven bits. In accordance with the present invention, it has been found that only 32 signal sequences suffice to represent a full 128 sequence. This reduction can be achieved because, using Guassian filtering, each bit, after the first, in a signal sequence is dependent upon the preceding bit or bits. Over any period of $+T > t > -4T$ (T is the bit duration), the bits have the following dependence:

| Period | Affected Bit | Dependent Upon |
| --- | --- | --- |
| $t > +T$ | $a_{+1}$ | $a_0, a_{-1}, a_{-2}$ |
| $-T > 0$ | $a_0$ | $a_{-1}, a_{-2}, a_{-3}$ |
| $-2T > -T$ | $a_{-1}$ | $a_{-2}, a_{-3}, a_{-4}$ |
| $-3T > -2T$ | $a_{-2}$ | $a_{-3}, a_{-4}, a_{-5}$ |
| $-4T > -3T$ | $a_{-3}$ | $a_{-4}, a_{-5}, a_{-6}$ |

It can be seen that the bits $a_0$ and $a_{-6}$ have an effect on only one subsequent bit of the sequence whereas bits $a_{-1}$ to $a_{-5}$ affect at least two subsequent bits. Rather than completely ignoring the effect of bits $a_0$ and $a_{-6}$, an averaging technique is used to produce the 32 sets of signal sequences that sufficiently approximate the 128 membered full set of signal sequences.

If the signal sequence is denoted by s(t,a), the approximate waveform, for n=0 and n=−4, is formed by modifying s(t,a) as follows:

a) $n = 0$ $$s(t,a) \approx g_0(t) \exp\left(j2\pi h \sum_{i=-5}^{-1} a_i q(t - iT)\right) \exp(j\phi')$$

where $g_0(t) = \; < \exp(j2\pi h \, a_0 q(t)) > \, a_0$ ($<> a_0$ denotes an averaging over $a_0$.)

$\phi'$ is the redefined phase state $\left(\phi' = \pi h \sum_{i=-\infty}^{-6} a_i\right)$ b) $n = -4$ $$s(t,a) \approx g_{-4}(t) \exp\left(j2\pi h \sum_{i=-5}^{-4} a_i q(t - iT)\right) \exp(j\phi')$$

$g_{-4}(t) = \; < \exp(j\pi h \, a_{-6} \{q(t + 2T) - 1\}) > \, a_{-6}$

The function q(t) has the form:

For $t \leq 0$     $q(t) = 0$

For $0 \leq t \leq 2T$     $q(t) = \int_{-\infty}^{t} f(u) \, du$

For $t > 2T$     $q(t) = \frac{1}{2}$

Where f(u) is the response of a Guassian low pass filter to a data symbol.

By using the foregoing averaging technique 128 digital signal sequences which have been Guassian filtered, can be represented by 32 signal sequences. The store 18, in the present invention holds digital representation of the waveform of only 16 signal sequences (the other 16 signal sequences can be derived as described below).

As stated above, the modulated data sequence is denoted by s(t,a) where is the reduced 5 bit data sequence. Before application of the Viterbi algorithm, it is necessary to convolve data sequences with the channel impulse response h(t) to form a signal set c(t,a). This is affected by complex convolution in the convoluter 16. It is also necessary to generate the squared modulus of the signal set ($|c(t,a)|^2$).

Downstream of the convoluter 16, is a signal selector 20 (described more fully below) in which appropriate signal sets c(t,a) are selected and fed to a metric generator 22.

The output of the A to D converter 12, the sampled and digitised incoming distorted GMSK signal, is also fed to the metric generator 22.

The required metric $\Gamma$ (a) to be generated is given by the formula:

$$\Gamma(a) = Re\left\{\int_{nt}^{(n + 1)T} r(t) \cdot c(t,a) dt\right\} - \tag{1.1}$$

$$0.5 \int_{nt}^{(n + 1)T} |c(t,a)|^2 dt.$$

where $r(t) = I(t) + jQ(t)$, the received signal.

As the sequence a has been reduced by averaging as described above, detection starts on the immediately preceding symbol transmitted rather than the current symbol, i.e. for a path memory length of N symbols, the Viterbi algorithm gives an estimate of the symbol $a_{n-N}$ rather than the symbol $a_{n-(N+1)}$ of a full state case ($a_n$ denotes the current symbol).

As stated above, only 16 signal sequences are stored in the store 18 and it is necessary only to convolve these 16 signal sequences s(t,a) with the channel impulse response h(t) in the convoluter 16. The other 16 signal sequences can be generated by summing terms involving the imaginary part of the sequences s(t,a), with differing signs. This is described mathematically as follows:

Denote sequence with opposite sign as $-a$ then the signals for these sequences are generated as:

$$Re\{c(t,a)\} = Re\{s(t,a)\} \otimes Re\{h(t)\} - Im\{s(t,a)\} \otimes Im\{h(t)\} \quad (1.2)$$

$$Im\{c(t,a)\} = Im\{s(t,a)\} \otimes Re\{h(t)\} + Re\{s(t,a)\} \otimes Im\{h(t)\} \quad (1.3)$$

Further, the multiplication by 0.5 in the modulus of the signal set (as in equation 1.1) need not be done if the store modulated data has the following form:

$$-s(t,a) = (1/\sqrt{2})\exp(j\phi(t,a)) \quad (1.6)$$

The important point here is the multiplication by $1/\sqrt{2}$.

The signal sets are fed from the signal selector 20 to the metric calculators 23 of the metric generator 22 together with the sampled, digitised baseband GMSK signals. The generator 22 produces the metrics which are used in the processor 24 as stated above.

In calculating the metrics, it is only necessary to use one sample/symbol. Consequently the FIR filtering or correlation process reduces to a single multiplication. The effect of the accumulated phase in the metric generation process is to require the I and Q data to be correlated with both the real and imaginary parts of the signal set, thus four correlators are used to generate one metric. However, because the accumulated phase takes the values O, $\pi/2$, $\pi$, $3\pi/2$, it is only necessary to perform two of the correlations in correlators 25. Which pair depend upon the phase state. Expanding expression 1.1 for the metric, and denoting the accumulated phase as $\theta$ the process described above is readily seen.

$$\Gamma(a) = \cos(\theta)\left(\int_{nT}^{(n+1)T} Re\{c(t,a)\}I(t)dt + \int_{nT}^{(n+1)T} Im\{c(t,a)\}Q(t)dt\right) + \sin(\theta)\left(\int_{nT}^{(n+1)T} Re\{c(t,a)\}Q(t)dt - \int_{nT}^{(n+1)T} Im\{c(t,a)\}I(t)dt\right) - 0.5\int_{nT}^{(n+1)T}|c(t,a)|^2 dt \quad (3.1)$$

$$\theta = \text{Mod}_{2\pi}\left(\pi/2 \sum_{i=-\infty}^{m-4} a_i\right) \quad (3.2)$$

Figure 2:
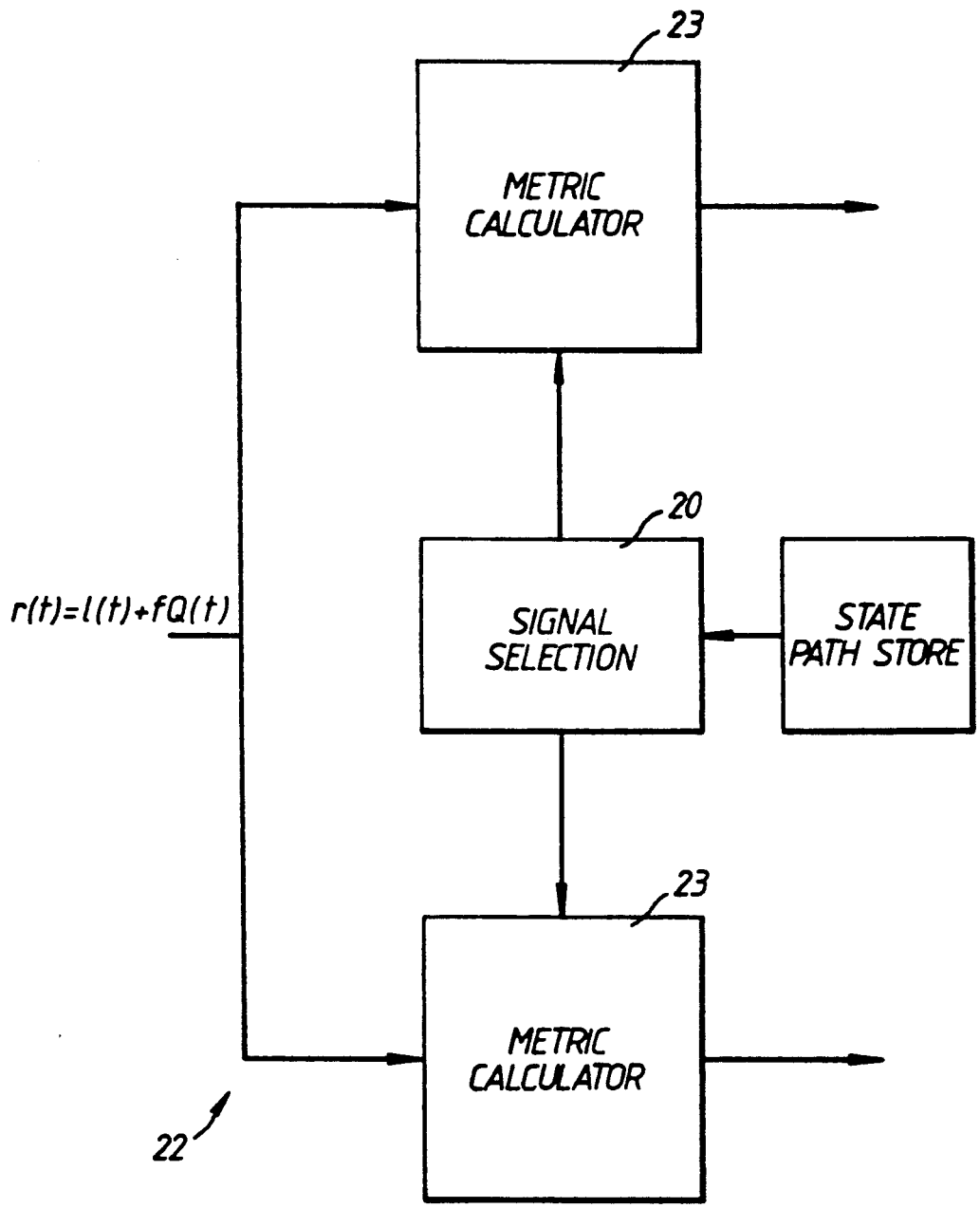
FIG. 2 is a block schematic diagram of a metric generator forming part of the equaliser of FIG. 1.
Figure 3:
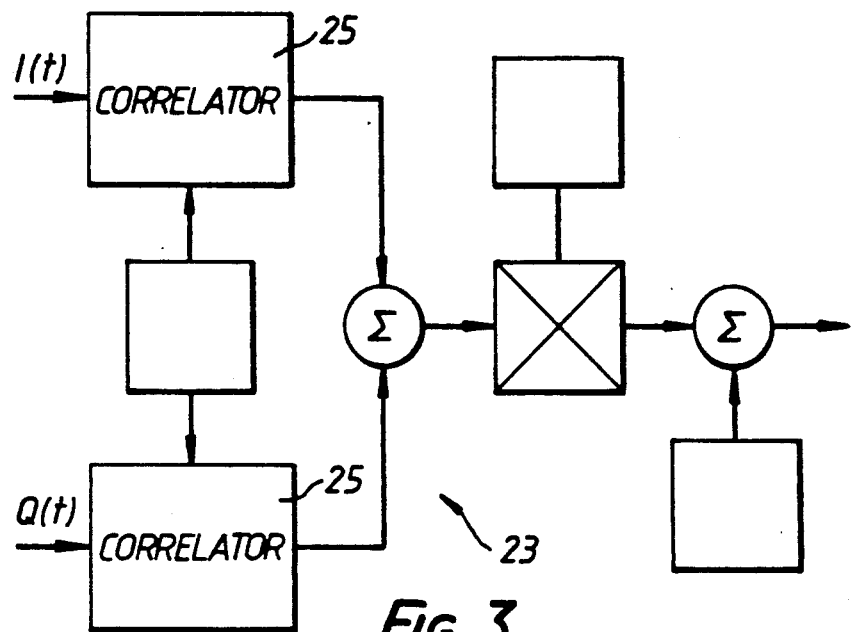
FIG. 3 is a block schematic diagram of a metric calculator of the metric generator of FIG. 2.

As stated hereafter in the description of the processor 24, the selection of which signals to use in the generation of the metrics depends upon the content of the path store 26. The path store 26 holds values of previously assumed signals up to $a_{m-5}$ in memories 27 and 28 and the accumulated phase (modulo $2\pi$) in a phase store 29. The metric generation process for a given sequence b is shown in FIGS. 2 to 4.

Figure 4:
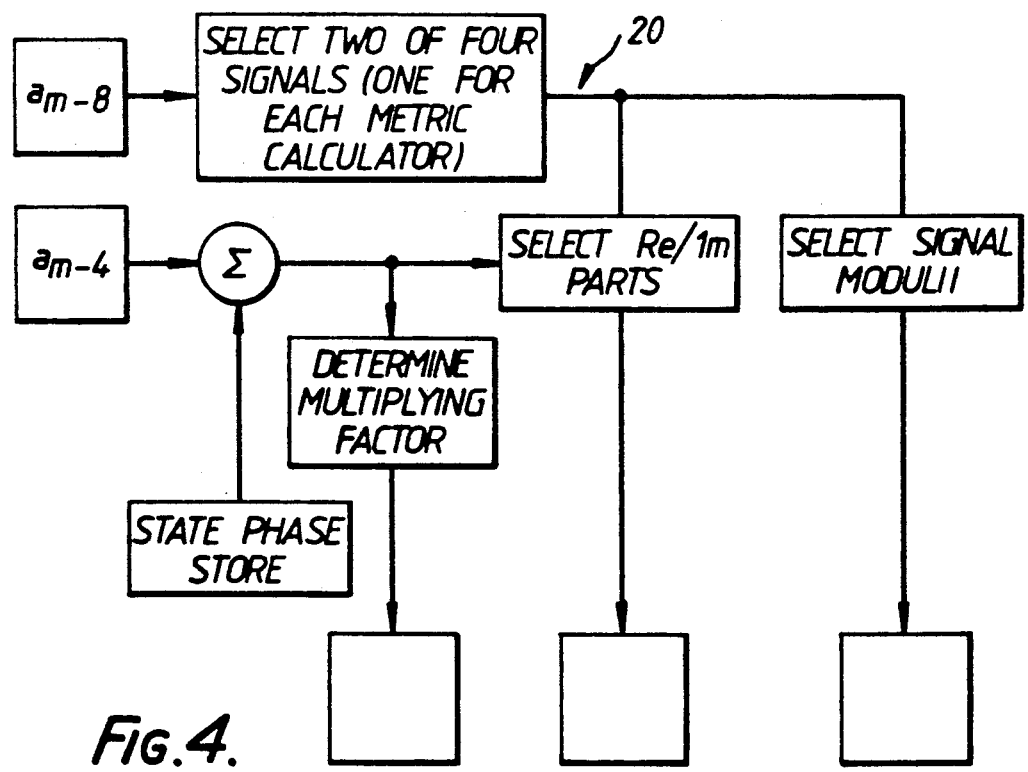
FIG. 4 is a block schematic diagram of a signal selector of a metric generator of FIG. 2.

Referring to FIG. 4, the convoluted signal sets c(t,a) from the convolutor 16 are fed to a first selector 30. In the first selector, half the sets are rejected in dependence upon the value $a_{m-4}$ supplied from the memory 27 of the path store 26. As indicated mathematically above, an input of $a_{m-5}$ from the memory 28 of the path store 26 and the accumulated phase from the phase store 29 are summed to provide an output for determining the multiplying factor to be applied through terminal A to the correlators/matched filters 25 (FIG. 3). The same output is applied to a second selector 31 for selecting the Real and Imaginary parts of the selected signal sets. The output from the second selector 31 is fed to terminal B. The first selector 30 also provides an output for the signal moduli selector 33 which is fed through terminal C to the final summer of the metric calculator 23 (FIGS. 2 and 4).

In the metric calculator 23 (FIGS. 2 and 3), the multiplying factor is fed from terminal A to each of the correlators/matched filters 25 to which are respectively fed the sampled digitized I and Q values of the baseband GMSK signals. The outputs of the correlators 25 are summed and fed to a processor 32 wherein the first part of the metric is calculated. The output of the processor 32 is fed to a final summer wherein the selected signal modulus is added before outputting to the Viterbi processor 24. After processing in the processor 24, an output is made of the most probable signal which is fed back to the state path store 26.

Figure 5:
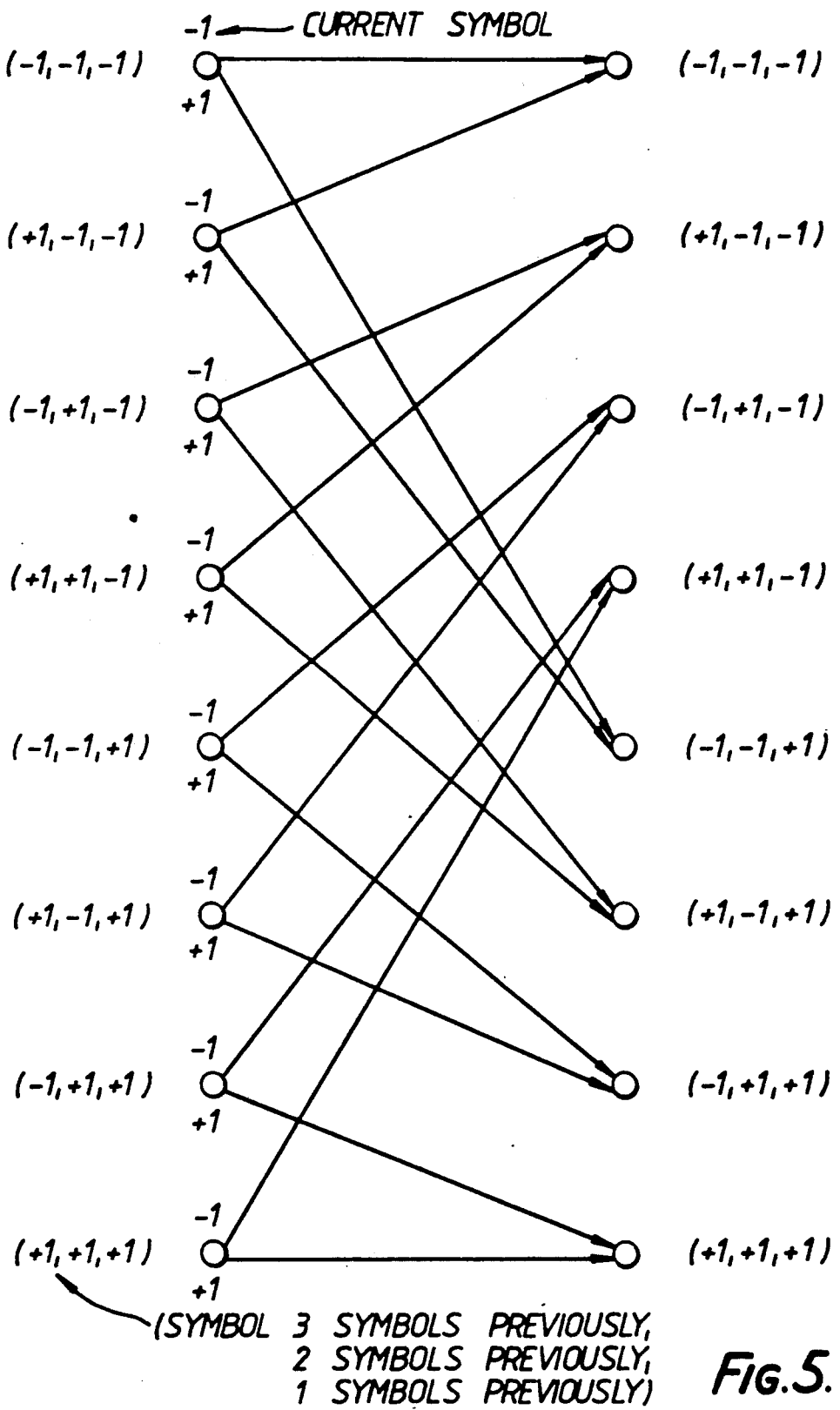
FIG. 5 is an 8-state trellis diagram.

The metrics generated in the generator 22 are fed to the processor 24 which determines probability on the basis of state trellis diagrams as shown in FIG. 5.

Given the sixteen signals, the number of states in the trellis is 64, which includes a set of phase states to account for the accumulated phase in the transmitted signal. This accumulated phase O can take one of four values (when reduced modulo $2\pi$): 0, $\pi/2$, $\pi$, $3\pi/2$. The reduced state equaliser described does not incorporate the phase states. Instead, for each state in the trellis, the accumulated phase is calculated based on the contents of the path store. The implication of this on the metric generation process was described above. To reduce further the number of states, a subset of the sequence a (sequence b) is used in the Viterbi processing. The sequence b is of length four symbols and consequently there are 8 states in the trellis diagram as shown in FIG. 5.

With the phase states removed and the averaging technique as described above applied to reduce the length of the sequence a, a 16 state equaliser results. In this case the Viterbi algorithm performs the following task: a selection procedure is used to keep the number of sequences involved in the maximisation of the metric constant. This involves taking sequences c(t, a) that differ only in the symbol $a_{m-4}$ (where $a_m = a_{n-1}$) and selecting the sequence with the largest metric. This is performed over all such combinations, and the largest of the surviving metrics forms the basis for the decision about the symbol $a_{m-N+1}$.

To reduce the number of states to 8, the following modification to the procedure outlined above is made:

instead of taking sequences that differ only in the symbol $a_{m-4}$, only sequences of length 4 symbols, that differ in the symbol $a_{m-3}$ are involved in the maximization of the metric.

In the 16 state equaliser, at each state in the trellis, there are two possible transitions. For each transition, there is, at the receiver, a signal c(t, a) used to generate the metric in the next symbol interval. For the 8 state case, there are now four possible transitions, depending upon the symbol $a_{m-3}$. To determine the two signals to use in generating the metric for the next symbol interval, the content of the path store is examined, hence an early decision is made as to the nature of the symbol $a_{m-3}$.

The values of the processed metrics are assessed and the largest processed metric is equivalent to the most probable signal. This is output for further processing to provide the data bit stream constituting the voice and-/or data communication.

Because averaging is used to reduce all possible 7-bit values to 5-bit values, and because of the use of the contents of the path store to control signal selection, a reduced state processor is possible.

I claim:

1. An equalizer for a radio signal receiver, said equalizer comprising:
   a converter for producing, from a received radio signal, digital samples at baseband, the received radio signal being in packet form and including a header having a predetermined bit sequence;
   means for providing an estimate of channel distorting by comparing the received predetermined bit sequence with a stored version of the predetermined bit sequence in the receiver;
   a signal set store in which signal sets are stored;
   means for applying the estimate of channel distortion to the stored signal sets to modulate the stored signal sets in accordance with the estimate;
   means for selecting modulated ones of the stored signal sets;
   metric generating means receiving said selected modulated stored signal sets and digital samples of said received radio signal for generating metrics of the selected stored modulated signal sets and the digital samples; and a processor for processing the generated metrics in accordance with a Viterbi algorithm to determined the most probably value of each digital sample of the received radio signal.

2. An equalizer as claimed in claim 1 wherein the stored sets are 5-bit sequences approximating all possible 7-bit sequences.

3. An equalizer as claimed in claim 2 further including a state path store and wherein said signal set store holds sixteen signals sets, eight of said sixteen signal sets forming a subset, said eight sets being selected on a basis so that each of the eight sets have the same symbol $a_{m-4}$ (where $a_m = a_{n-1}$ and $a_n$ is the instantaneous digital sample of the received radio signal), for use in generating the metrics, in dependence upon the contents of said state path store.

4. An equalizer as claimed in claim 3 wherein said signal set store holds eight signal sets, four of said signals sets forming a subset, said four sets being selected on a basis of having the same symbol $a_{m-3}$.

5. An equalizer for a radio signal receiver, said equalizer comprising:
   a converter for producing, from a received radio signal, digital samples at baseband, the received radio signal being in packet form and including a header having a predetermined bit sequence;
   a store for storing an undistorted version of said predetermined bit sequence;
   means for providing an estimate of channel distortion by comparing the received predetermined bit sequence with said stored undistorted version of said predetermined bit sequence;
   means for applying the estimate of channel distortion to a plurality of stored signal sets to modulate the plurality of stored signal sets in accordance with the estimate;
   means for selecting modulated ones of the stored signal sets;
   metric generating means receiving said selected modulated stored signal sets and digital samples of said received radio signal for generating metrics of the selected stored modulated signal sets and the digital samples; and
   a processor for processing the generated metrics in accordance with a Viterbi algorithm to determine the most probable value of each digital sample of the receive radio signal.

* * * * *